US012591581B2

(12) United States Patent
Wen

(10) Patent No.: US 12,591,581 B2
(45) Date of Patent: Mar. 31, 2026

(54) PROGRAMMATIC DATA PROCESSING SYSTEM

(71) Applicant: Nanfu Wen, Beijing (CN)

(72) Inventor: Nanfu Wen, Beijing (CN)

( * ) Notice: Subject to any disclaimer, the term of this patent is extended or adjusted under 35 U.S.C. 154(b) by 225 days.

(21) Appl. No.: 17/838,299

(22) Filed: Jun. 13, 2022

(65) Prior Publication Data

US 2022/0309069 A1    Sep. 29, 2022

Related U.S. Application Data

(63) Continuation-in-part of application No. PCT/CN2020/130349, filed on Nov. 20, 2020.

(30) Foreign Application Priority Data

Dec. 13, 2019    (CN) .......................... 201911297512.8

(51) Int. Cl.
　　*G06F 16/2457*　　(2019.01)
　　*G06F 16/17*　　(2019.01)
　　*G06F 16/2458*　　(2019.01)

(52) U.S. Cl.
　　CPC ...... *G06F 16/24575* (2019.01); *G06F 16/173* (2019.01); *G06F 16/2468* (2019.01)

(58) Field of Classification Search
　　CPC ........... G06F 16/24575; G06F 16/2468; G06F 16/173
　　See application file for complete search history.

(56) References Cited

U.S. PATENT DOCUMENTS

2020/0356565 A1* 11/2020 Stewart ................... H04L 12/16

FOREIGN PATENT DOCUMENTS

CN　　104200339 A　　12/2014
CN　　104899035 A　　9/2015

OTHER PUBLICATIONS

International Search Report of PCT Patent Application No. PCT/CN2020/130349 issued on Feb. 22, 2021.

* cited by examiner

*Primary Examiner* — Etienne P Leroux
*Assistant Examiner* — Husam Turki Samara
(74) *Attorney, Agent, or Firm* — Bayramoglu Law Offices LLC

(57) ABSTRACT

A programmatic data processing system includes a data acquisition module (DAM) and a data management module (DMGM). The data acquisition module (DAM) is configured to stepwise acquire data of material information (DMI) and data of operation information for processing the materials during a processing period according to a processing step. Defining the operations on materials in the same period as a specified standard step, and defining formation process of a real object or the process of real operation as different steps arranged in chronological order, stepwise entering and updating the information in each standard step. Furthermore, different steps are sequenced and combined in chronological order, and a complete formation process of a real object (operation) is restored in the form of inputable information.

11 Claims, 6 Drawing Sheets

S1: Clicking a search content input box:

| · Phase | Preparation phase | | ⬭Close |
|---|---|---|---|
| Raw material 1 | | | ⊕Add  ✕Delete |

· Raw material — [ Entering a raw material to be subjected to search    🔍 ]

By default, all raw materials are in a standard natural environment

S2: Entering content in the input box:

· Raw material

[ Chicken heart    🔍 ]

Search result    ✕

Chicken, chicken heart, all categories, uncooked

S3: Selecting a target option:

· Raw material

[ Chicken heart    🔍 ]

Search result    ✕

Chicken, chicken heart, all categories, uncooked

S4: Generating an interactive page, and completing information according to the interactive page:

· Raw material    [ Chicken, chicken heart, all categories, uncooked * ]

· Value /unit    [ Enter a value ]    [ Select a unit    ⌃ ]

By default, all raw materials are in a standard natural environment heart

Unit (1 pound of cooked chicken)

gram

· Edible or inedible    ⊛edible    inedible

· Remove inedible portion    ⊛ default (Auto)    reserve

FIG. 5

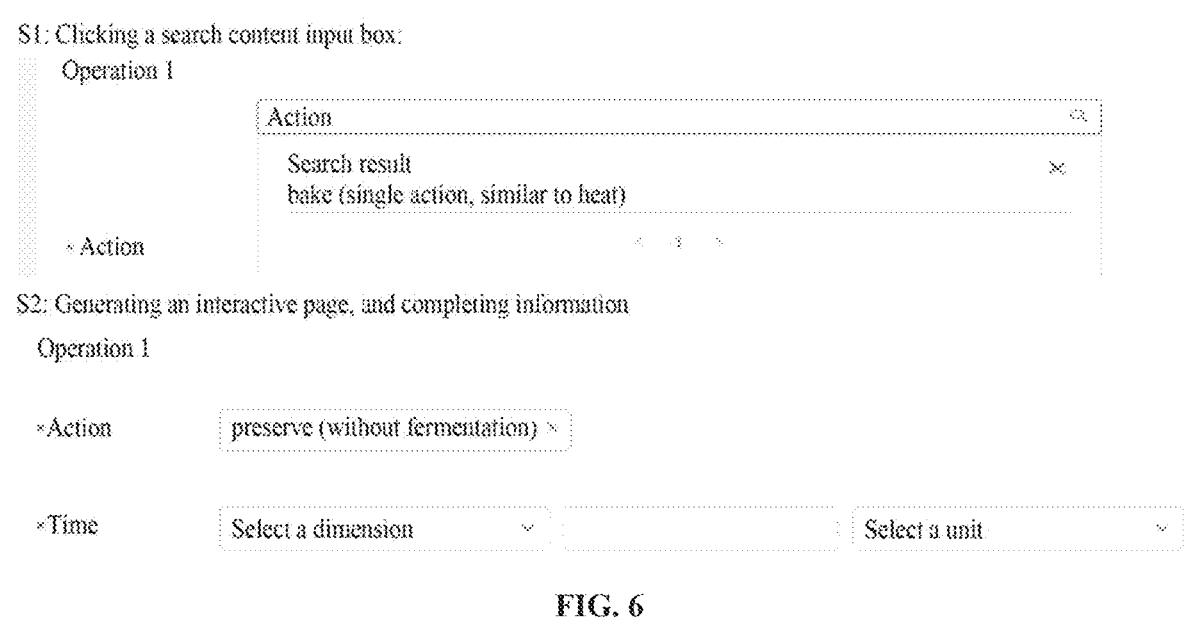

S1: Clicking a search content input box:

Operation 1

| Action |   |
| --- | --- |
| Search result | |
| bake (single action, similar to heat) | |

×Action

S2: Generating an interactive page, and completing information

Operation 1

×Action     | preserve (without fermentation) × |

×Time     | Select a dimension ∨ |     | Select a unit ∨ |

FIG. 6

PROGRAMMATIC DATA PROCESSING SYSTEM

CROSS REFERENCE TO RELATED APPLICATIONS

The present application is a Continuation-In-Part application of PCT Application No. PCT/CN2020/130349 filed on Nov. 20, 2020, which claims the benefit of Chinese Patent Application No. 201911297512.8 filed on Dec. 13, 2019. All the above are hereby incorporated by reference in their entirety.

TECHNICAL FIELD

The present invention relates to the field of computer application technologies and, specifically, to a programmatic data processing system.

BACKGROUND

Along with social progress and development, our daily life is increasingly data-driven; when powerful data processing systems are integrated into existing workflows, business is improved, and industry is transformed. However, how to acquire the data and process for applications from the real object is the most important thing. After it, people can tackle interoperable data to improve existing workflows and meet the increasing demand for individual and social needs. Professional training and specific equipment are necessary for data acquisition and processing in different areas. Mainly it required people who have higher education in a specific area with years of training. People need specific training to tackle interoperable data, even if they have a long-term work experience in the same area. The data processing also costs an extended work period and expensive charges. It is hard to deal with the increasingly complex and volatile requirements in today's world. The problem is if we want to improve existing workflows and meet the increasing demand for individual and social needs by using the data-driven approach, it requires people to have long-term training and to be equipped with deep cast of data processing, which could hinder the spread of the data-driven approach.

If we want to acquire the data and process for applications from the real object, we first need to find a way to help people easily use it. Beyond that, we also need to figure out several questions to adapt to today's world's increasingly complex and volatile requirements. First is diversity; people use different languages from different backgrounds, which could cause differences in communication and different definitions of the same object. Second, we need a highly flexible modular system to meet the volatile challenge. Lastly, we need to acquire specific information and separate processing flow paths in different areas.

SUMMARY

Therefore, it is an object of the invention to seek to provide a data processing system to acquire, maintain and record data. It doesn't require people with a deep cast of data process in different areas.

The present invention discloses a highly automatic flexible modular system. It can store the data acquired from real objects in different areas. Based on the increasingly complex and volatile data processing requirements, the present system defines the flow paths according to the standard path in different areas, and provides users with automatic interoperable navigation. The present system defines the real object as containing at least two kinds of descriptive data: the data of material information and the data of operation information. The operation process of the real object is divided into one step or multiple steps according to the time sequence. In each step, the present system acquires data of material information and the data of operation information for processing the materials and finally forms a product information. In multiple steps, the product information of each step will become the material information of the next step. Follow the real operation process step by step until the entire operation process of the object is completed. It controls the process in steps at different period of an operation process normatively according to the unified process. The system also provides different types of automatic interoperable navigation, which can update and supplement professional content in different area for users to input or select. Defining the operations on materials in the same period as a specified standard step, and defining formation process of a real object or the process of real operation as different steps arranged in chronological order, stepwise entering and updating the information in each standard step. Furthermore, different steps are sequenced and combined in chronological order, and a complete formation process of a real object (operation) is restored in the form of inputable information. Therefore, even people with different professional and cultural backgrounds but without a professional data acquisition and recording training also can professionally acquire and record data under automatic interoperable navigation, so that a solid foundation for subsequent data processing and application is established.

The present invention discloses a programmatic data processing system, comprising a data acquisition module (DAM) and a data management module (DMGM). The data acquisition module (DAM) is configured to stepwise acquire data of material information (DMI) and data of operation information for processing the materials during a processing period according to a processing step. The data acquisition module (DAM) comprises a material acquisition module (MAM) and/or an operation acquisition module (OAM). The data of material information (DMI) comprises physical attribute data and/or environment attribute data; The operation information (DOI) comprises actions and/or navigation behaviors and/or judgment choice;

the data management module (DMGM) is configured to store the data of material information (DMI) and/or the data of operation information (DOI) and/or data of product information (DPI), wherein The DPI is a data set comprising the DMI and the DOI. The DPI is created by using the DAM to combine the DMI and the DOI in the single or multiple periods; the DPI, DMI and/or the DOI are stored to the data management module (DMGM);

the material acquisition module (MAM) comprises a material searching module (MSM) configured to interact with the data management module (DMGM) to search for existing data of material information (DMI) and display the data of material information (DMI) on a client for selecting;

the operation acquisition module (OAM) comprises an operation searching module (OSM) configured to interact with the data management module (DMGM) to search for existing data of operation information (DOI) and display the data of operation information (DOI) on a client for selecting;

the material acquisition module (MAM) further comprises a data interoperable module (DIM) is configured to receive data of supplementary material information (DSMI) selected from the client and interact with the data management module (DMGM) to generate an interactive page and a renewed data of material information obtained by incorporating the data of supplementary material information (DSMI) with the data of material information (DMI);

the operation acquisition module (OAM) further comprises a data interoperable module (DIM) configured to receive a data of supplementary operation information (DSOI) selected on the client and interact with the data management module (DMGM) to generate an interactive page and a renewed data of operation information (DOI) obtained by incorporating the data of supplementary operation material information (DSOI) with the data of operation information (DOI), the renewed data of material information (DMI) and/or the renewed data of operation information (DOI) are also stored to the data management module (DMGM).

The data management module (DMGM) comprises a data maintenance module (DMTM). The data maintenance module (DMTM) performs maintenance operation to the data of material information (DMI) and data of operation information (DOI), including the data of Name Definition (DND) and/or data of Dimension Definition (DDD) and/or data of Specialty Definition (DSD). The maintenance operation can be adding, revising, choosing units, inputting value in setting ranges, selecting items showing by automatic navigation, displaying in primer formats and modes, multilingual matching, and associating related basic description and/or dimensional information.

The data of material information (DMI) is stored in group. The data of operation information (DOI) is stored in group. The data maintenance module (DMTM) performs maintenance operation to each group. The data maintenance module (DMTM) further comprises a product creation module (PCRM) and/or a product combining module (PCNM) and/or a product dividing module (PDVM) and/or a product adjusting module (PAJM).

The product creation module (PCRM) and/or a product combining module (PCNM) and/or a product dividing module (PDVM) and/or a product adjusting module (PAJM) is associated with the data of a product information (DPI).

The data interoperable module (DIM) generates an interactive page with the data of Dimension Definition (DDD) of DMI and DOI and receives the specific data entered. The data interoperable module (DIM) further comprises a Special Option (SO) for setting and displaying professional and personal matters for user selecting. The data maintenance module (DMTM) performs maintenance and creation operation to the data of Special Option (SO). The material searching module (MSM) performs fuzzy retrieval and/or precise retrieval.

A data entry module (DEM) transmits the desirable data of user to the data maintenance module (DMTM) if there is no related data after performing fuzzy retrieval and/or precise retrieval. The data maintenance module (DMTM) enters the desirable data into the group of data of material information (DMI) and data of operation information (DOI).

The material searching module (MSM) comprises a data error correction module (DECM). DECM lists a search result set and shows a tip that the results do not match the search.

The present invention provides a highly flexible modular system to acquire specific information and separate processing flow paths for people with different professional and cultural backgrounds but without professional training and specific equipment. The system also provides large-scale information input with a low access threshold and guarantees a real operation process required to restore data in a related field precisely.

BRIEF DESCRIPTION OF THE DRAWINGS

FIG. 5 is a display example of material acquisition step on a client; and

FIG. 6 is a display example of an active acquisition step on a client.

DETAILED DESCRIPTION

Figure 1:
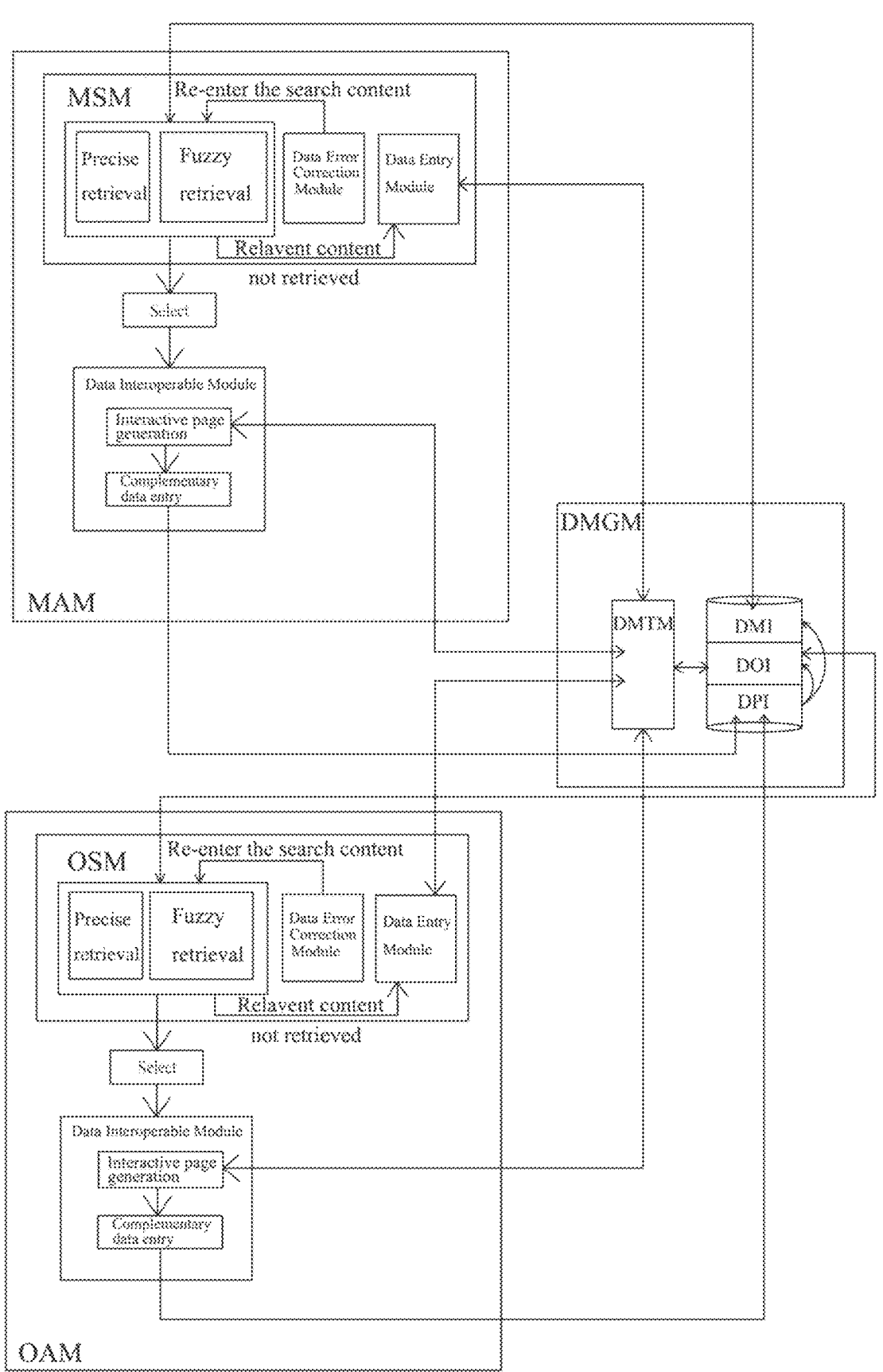
FIG. 1 is a diagram of the core logic of the present invention.
Figure 2:
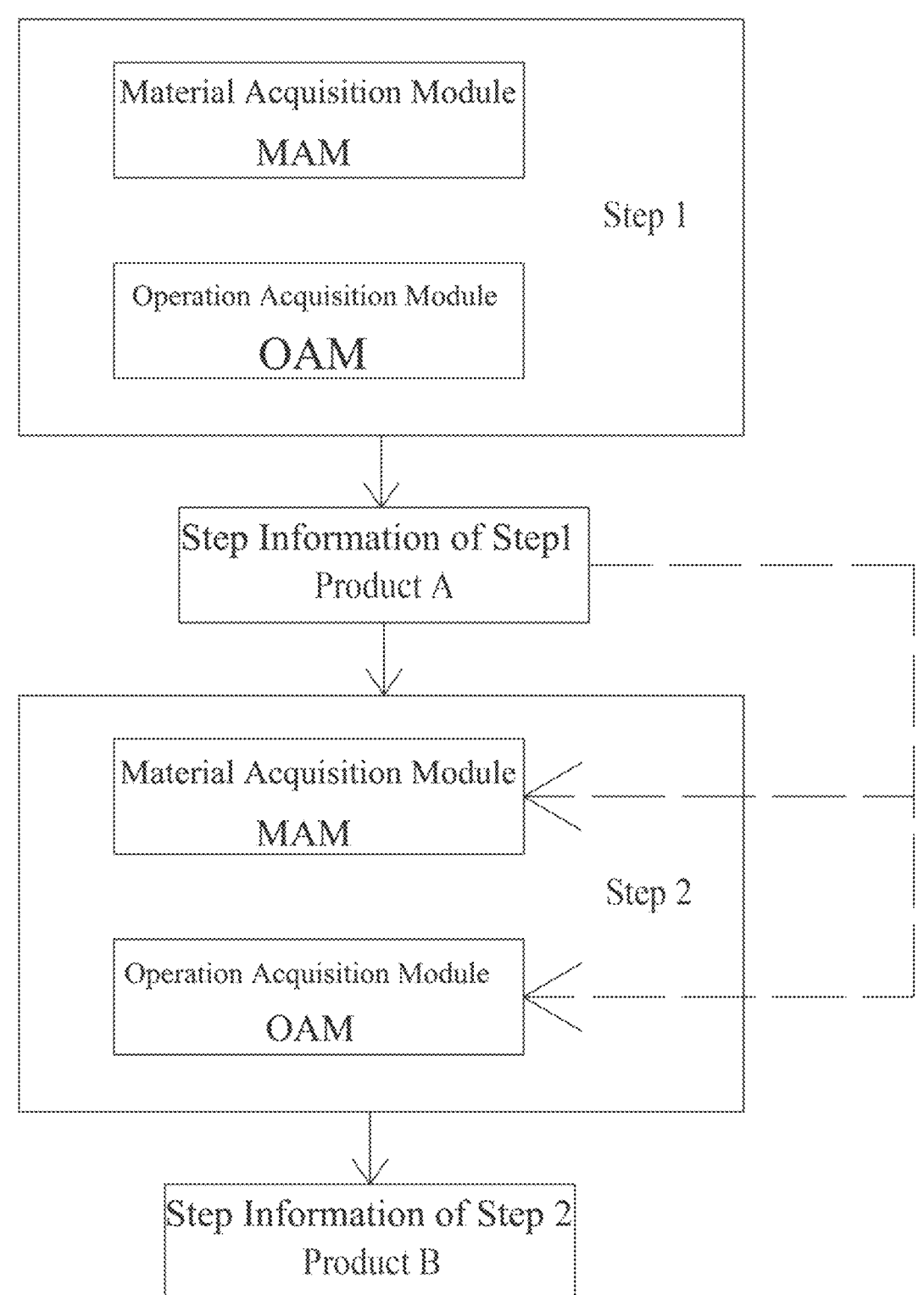
FIG. 2 is a schematic diagram of generating step information of the present invention.
Figure 3:
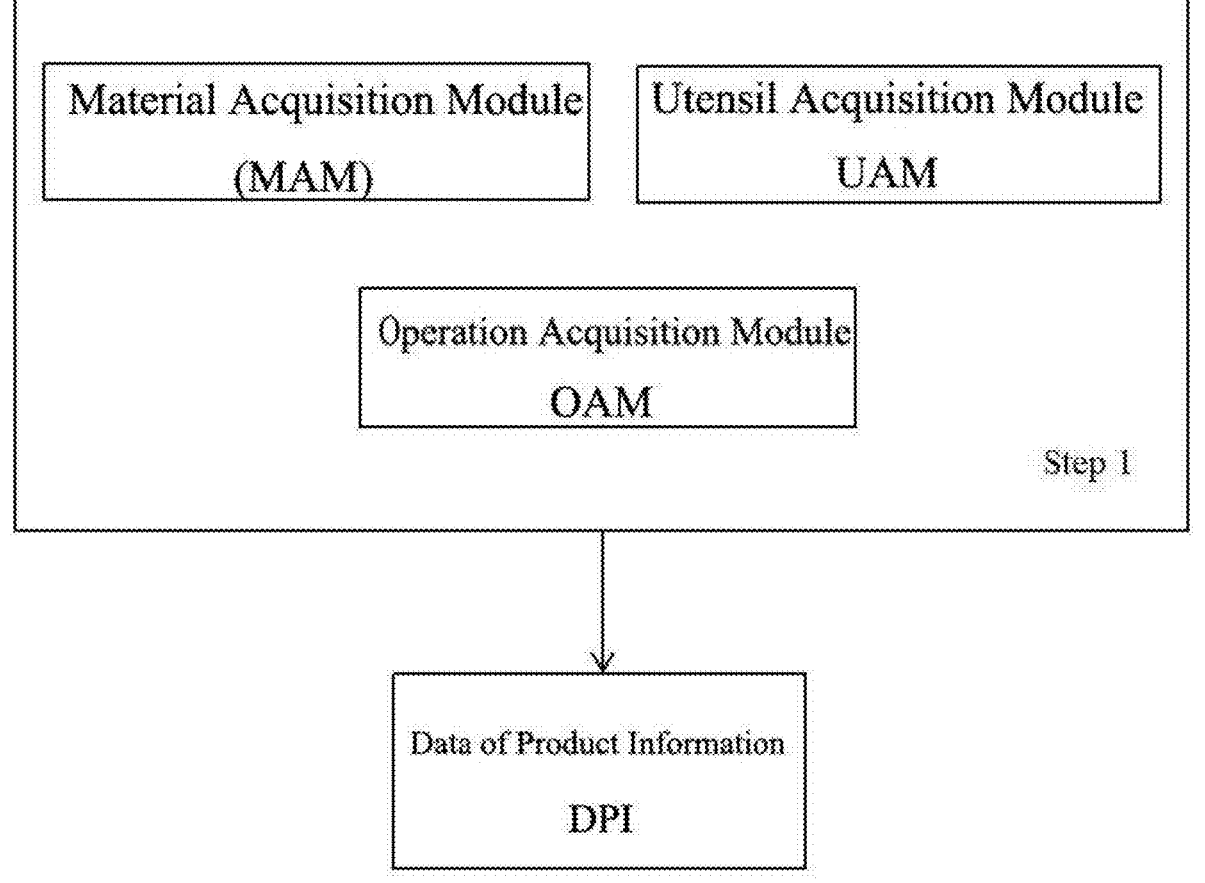
FIG. 3 is another schematic diagram of generating step information of the present invention.
Figure 4:
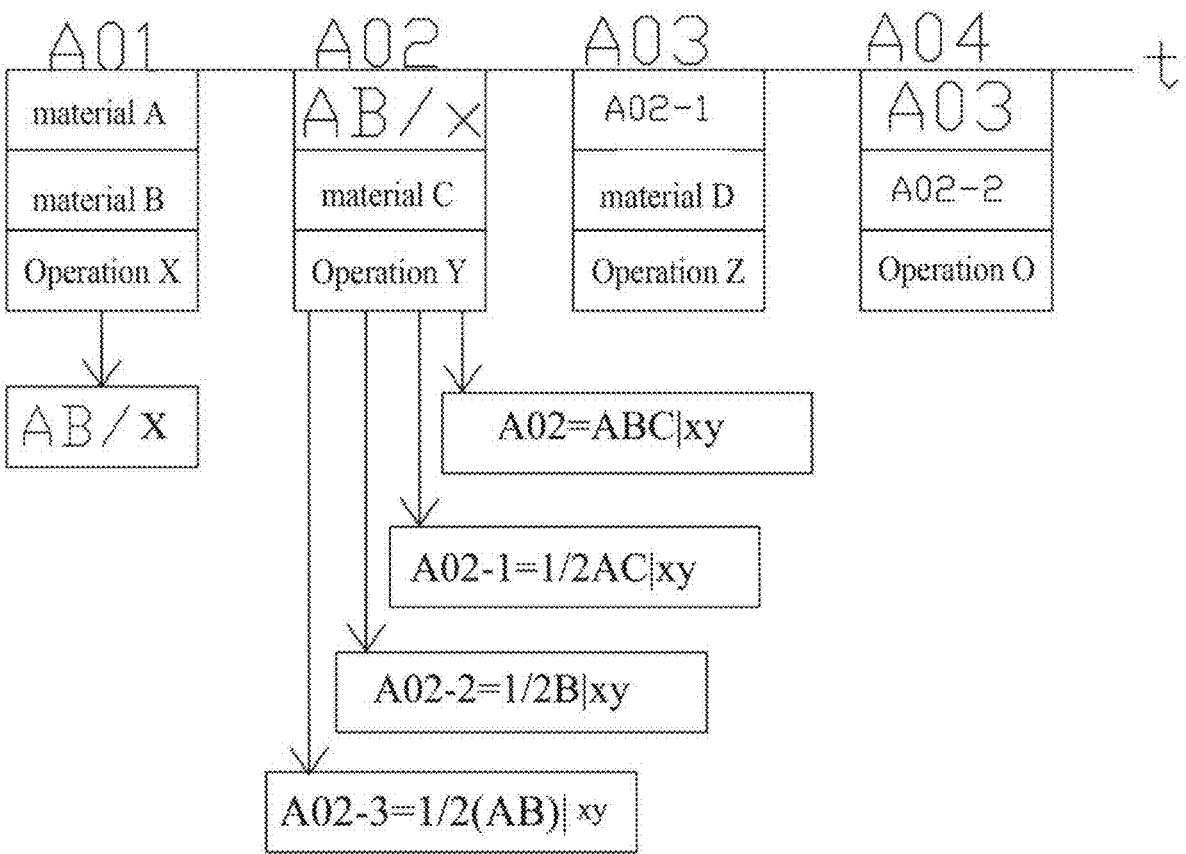
FIG. 4 is a diagram showing the working principles of a material acquisition module and an operation acquisition module by using a time axis as a frame of reference.

Specifically, the present invention comprises a client and a database. The interaction between the client interface and the database implements the corresponding functions. The client provides a data input interface and a data maintenance interface. The persons of different cultures and areas use the data input interface to entry and interaction the information, and use the data maintenance interface to maintain and expand the basic data of the system.

Overall, the purpose of the present system is to divide the formation process of a real object or the process of real operation into different steps in chronological order, and acquire the data of information stepwise quickly, accurately, and professionally. And most basically, Defining the operations on materials in the same period as a specified standard step, and defining formation process of a real object or the process of real operation as different steps arranged in chronological order, stepwise entering and updating the information in each standard step. Furthermore, different steps are sequenced and combined in chronological order, and a complete formation process of a real object (operation) is restored in the form of inputable information. The corresponding complete operation process in reality can be restored through arranging each standard step in sequence. The detailed steps of data input of the client will be explained in details in order to better illustrate the implementation of this patent.

The system needs to judge the language selected by the current user, and regulate the differences between different languages and cultural when displaying (including the region where the language is used, for example, English-United States, English-United Kingdom, and English-Australia). The user language is the default language of the user's operating system when the user entering data or creating account on the client. Indeed, the user can customize system's language, thereby changing the system's initial language.

The system displays the relevant interface in different languages and match the corresponding language. As described above, "the user acquires the data and process for applications from the real object" means "the user acquires the data of product information (DPI) which is a data set comprising the data of material information (DMI) and the data of operation information (DOI) during each processing period". The data set comprises two categories: the data of material information (DMI) and the data of operation information (DOI). The data of material information (DMI) includes but is not limited to the data of material information and utensil information, also includes the data of product information (DPI) of the previous step. The data of operation information (DOI) is descriptive and normative, include but is not limited to the data of human operation actions, the data of actions of the machine. The DMI and the DOI are the necessary data of the operation process in each processing period. Therefore, during a processing period, the material acquisition module (MAM) is configured to acquire data of material information (DMI) and the operation acquisition module (OAM) is configured to acquire the data of operation information for processing the materials. The DMI and the DOI form a data set for each step.

The data interoperable module (DIM) receives the data of supplementary material information (DSMI) and interact with the data management module (DMGM), acquire a renewed data of material information. The data in the present system including stored data in the database and the data the user is creating, inputting, and editing. The stored data is the maintained data by administrators, and the edited data by user First, please refer to FIG. 1, which is a diagram of the core logic of the present invention.

The present invention discloses a programmatic data processing system, comprising a data acquisition module (DAM) and a data management module (DMGM). The data acquisition module (DAM) is configured to stepwise acquire data of material information (DMI) and data of operation information for processing the materials during a processing period according to a processing step. The data acquisition module (DAM) comprises a material acquisition module (MAM) and/or an operation acquisition module (OAM). The data of material information (DMI) comprises physical attribute data and/or environment attribute data; The operation information (DOI) comprises actions and/or navigation behaviors and/or judgment choice; the data management module (DMGM) is configured to store the data of material information (DMI) and/or the data of operation information (DOI) and/or data of product information (DPI), wherein the data of product information (DPI) is a data set comprising the data of material information (DMI) and/or the data of operation information (DOI) acquired by the data acquisition module (DAM) during a single processing period or a plurality of processing periods; the material acquisition module (MAM) comprises a material searching module (MSM) configured to interact with the data management module (DMGM) to search for existing data of material information (DMI) and display the data of material information (DMI) on a client for selecting; the operation acquisition module (OAM) comprises an operation searching module (OSM) configured to interact with the data management module (DMGM) to search for existing data of operation information (DOI) and display the data of operation information (DOI) on a client for selecting; the material acquisition module (MAM) further comprises a data interoperable module (DIM) is configured to receive data of supplementary material information (DSMI) selected from the client and interact with the data management module (DMGM) to generate an interactive page and a renewed data of material information obtained by incorporating the data of supplementary material information (DSMI) with the data of material information (DMI); the operation acquisition module (OAM) further comprises a data interoperable module (DIM) configured to receive a data of supplementary operation information (DSOI) selected on the client and interact with the data management module (DMGM) to generate an interactive page and a renewed data of operation information (DOI) obtained by incorporating the data of supplementary operation material information (DSOI) with the data of operation information (DOI); the data of material information (DMI) and/or the renewed data of material information (DMI), and data of operation information (DOI) and/or the renewed data of operation information (DOI) are stored to the data management module; in each period, the material acquisition module (MAM) acquire data of material information (DMI) and the operation acquisition module (OAM) acquire the data of operation information for processing the materials, the DMI and the form the data of a product information (DPI), the DPI is stored to the DMGM; the DMI and the in multiple periods form the data of a product information (DPI), the DPI is stored to the DMGM. The data management module (DMGM) comprises a data maintenance module (DMTM). The data maintenance module (DMTM) performs maintenance operation to the data of material information (DMI) and data of operation information (DOI), including the data of Name Definition (DND) and/or data of Dimension Definition (DDD) and/or data of Specialty Definition (DSD). The maintenance operation can be adding, revising, choosing units, inputting value in setting ranges, selecting items showing by automatic navigation, displaying in primer formats and modes, multilingual matching, and associating related basic description and/or dimensional information. The data of material information (DMI) is stored in group. The data of operation information (DOI) is stored in group. The data maintenance module (DMTM) performs maintenance operation to each group. The data maintenance module (DMTM) further comprises a product creation module (PCRM) and/or a product combining module (PCNM) and/or a product dividing module (PDVM) and/or a product adjusting module (PAJM). The product creation module (PCRM) and/or a product combining module (PCNM) and/or a product dividing module (PDVM) and/or a product adjusting module (PAJM) is associated with the data of a product information (DPI). The data interoperable module (DIM) generates an interactive page with the data of Dimension Definition (DDD) of DMI and DOI and receive the specific data entered by the user. The data interoperable module (DIM) further comprises a Special Option (SO) for setting and displaying professional and personal matters for user selecting. The data maintenance module (DMTM) performs maintenance and creation operation to the data of Special Option (SO). The material searching module (MSM) performs fuzzy retrieval and/or precise retrieval. A data entry module (DEM) transmits the desirable data of user to the data maintenance module (DMTM) if there is no related data after performing fuzzy retrieval and/or precise retrieval. The data maintenance module (DMTM) enters the desirable data into the group of data of material information (DMI) and data of operation information (DOI). The material searching module (MSM) comprise a data error correction module (DECM). DECM list a set of search results and show a tip that the results do not match the searching.

Corresponding functions and embodiments will be described in following details.

I. Material Acquisition Module (MAM).

The material acquisition module (MAM) comprises a material searching module (MSM) and a data interoperable module (DIM).

1. Material Searching Module (MSM)

The material searching module (MSM) comprise a fuzzy retrieval module (FRM), a precise retrieval module (PRM), a data entry module (DEM) and a data error correction module (DECM).

The fuzzy retrieval module (FRM) conducts a query of the database based on the input keywords and display the information corresponding to keywords in a certain order. For example, a name information can be a generic name, a display name, an exact name, an academic name, a dialect name, an abbreviation, etc. The related information but different with the keywords can be added into this order. The language of the displayed information is same to the language consistent with an operation interface of information user.

The precise retrieval module (PRM) conducts a query of the database based on the input keywords and acquire a precise data of material information (DMI), data of operation information (DOI) and data of the utensil information (DUI) in the database. In the interactive page user input a word, PRM can find the precise ID in the database and display the precise information.

The data entry module (DEM) transmits the desirable data of user to the data maintenance module (DMTM) if there is no related data after performing fuzzy retrieval and/or precise retrieval. The data maintenance module (DMTM) enters the desirable data into the group of data of material information (DMI) and data of operation information (DOI). The administrator receives the message form the data entry module (DEM) and complete can complete and maintain related data information. The data entry module (DEM) generates an interactive page and receive the desirable data of user input, transmits the data to DMTM, renewed DMI, DOI, DUI and the related information.

In addition to content that can be retrieved usually and that is not recorded in a database yet, some content has been entered by the user but does not conform to information in a currently searching region. Any searching module or maintenance will not be invoked in a next step. For example, entering "heat" as a keyword in a material searching region. The data error correction module (DECM) lists a set of search results and show an Operation Tip that the results do not match the searching. For example, the Operation Tip is "This content is non-selectable, please try others".

Based on the idea of the present invention, further comprise a Step Information (SI) formed by combining the data of material information (DMI) and/or the data of operation information (DOI) in a processing step or a data set of Multiple Steps (ISMS) formed by Step Information (SI) of a plurality of steps. Each of the Step Information (SI) of certain step and the Data Set of Multiple Steps (DSMS) considered as the data of product information (DPI). The data of product information (DPI) also considered as the data of material information (DMI) that can be retrieved and selected repeatedly. The data of product information (DPI) are preferentially listed as a selectable item of the DMI in each step in the same general process. In addition, DPI of another step may also be considered as DMI, thereby being used in different processing period. The material searching module (MSM) performs fuzzy retrieval and/or precise retrieval. The DPI can be retrieved not only by inputting a keyword by the user (the above fuzzy retrieval module (FRM)), but also by specialized ID-based precise matching and the like for fast matching (the above precise retrieval module (PRM)). The DPI or DMI/DOI of the DPI can be divided, and the divided data can be selected and used. For detailed information about selection, editing, recording, and the like of the product, refer to the "Product Management Module (PMM)".

2. Data Interoperable Module (DIM)

The data interoperable module (DIM) comprises interactive page generation module (IPGM) and a data entry module (DEM).

The material searching module (MSM) receive the input information of user and list the search result. The system provides a corresponding unique ID in the database based on the information selected by user in the list search result. For example, the information " "酒精 (Chinese characters for ethanol)", " "乙醇 (Chinese characters for another name of ethanol)", "Ethanol", "$CH_3CH_2OH$" are in the list, no matter which item in the list you choose, the input always corresponds to a unique ID in the database. All relevant data corresponding to the unique ID can be selected and used in system interaction normalized by other professional acquisition requirements.

After the unique ID is invoked from the database, the data interoperable module (DIM) generates an interactive page display different interaction content for completing and inputting information, in system interaction normalized by different other professional acquisition requirements. For example, physical attributes of a material, which include but are not limited to the quality, temperature, air pressure, state, and volume. In addition, for some professional acquisition and input requirements, related information input content, including a default option, is added. For example, in food processing, whether a material is used for an eating purpose and whether to remove inedible portions are determined. In the medical field, whether a material is in a germ-free state is determined. In different fields, determination input options corresponding to input information are automatically generated through the data maintenance module (DMTM). This is described below in detail.

The interactive page generation module (IPGM) generates an interactive page automatically for acquisition and input. The maintenance information corresponding to the data of materials in the database in the interactive page includes unit selection, value input, and professional norm judgement. Non-professional data acquisition persons can quickly implement input of a material required in a corresponding professional field through corresponding interaction.

For example, in the field of food processing, selected "egg" as a result, through an interactive association relationship with the database, interaction on the client can display "Value/unit", "Raw material temperature", "Ambient temperature", "Elevation", "Air pressure", "Edible or inedible", "Remove inedible portion", and the like as input items. For the "Value/unit", including but not limited to ml, L, g, kg, large egg (57 g on average), gal, oz, and bl, when the user selects one of the unit, and input a value, the quantity of "egg" used as a material can be precisely defined. Values of "material temperature", "Ambient temperature", "Elevation", and "Air pressure" respectively show states of "egg" and the environment. The data interoperable module (DIM) further comprises a Special Option (SO) for setting and displaying professional and personal demand for user selecting. The data of Special Option (SO) can be the default options, such as "Edible or inedible" and "Remove inedible portion". It can not only realize the rapid collection of standardized content, but also realize the setting of special option of non-standardized content.

The administrator creates different formatted interactive page using the interactive page generation module (IPGM) according to different professional requirements. Formatted interactive page comprise a drop-down selection item, a drop-down selection item with a default value, a value input window, a single-choice item, a multiple-choice item, and other interaction modes. Different input content can be adjusted quickly accordingly by maintaining input requirements and association relationships of different data, combining different formative interaction content, and supplementing corresponding interactive text guidance and associated data. All content of drop-down boxes, data input boxes, the single or multiple-choice item is formatively maintained information, and does not need complex debugging. All information corresponding to a group can be matched quickly through group management corresponding to input content. The user can fill in a corresponding value and check a corresponding option in a normative template to guarantee realizability and authenticity of different data.

For example, compared to the above example "egg", the following association is performed during maintenance: "Value/unit: a drop-down box containing a default option, and a value input box", "Raw material temperature: two drop-down boxes containing default options, and one data input box", "Ambient temperature: a drop-down box containing a default option, and a value input box", "Elevation: a drop-down box containing a default option, and a value input box", "Air pressure: a drop-down box containing a default option, and a value input box", "Edible or inedible: a single-answer item with a default option", and "Remove inedible portion: a single-answer item with a default option". In the field of food processing, when the data of the utensil information (DUI) input as the data of material information (DMI), only display the associated item "Value/unit" and "Preheating temperature" which include a drop-down box containing a default option, and a value input box.

For the above content, refer to FIG. 1.

II. Operation Acquisition Module (OAM).

The operation acquisition module (OAM) comprises an operation searching module (OSM) and a data interoperable module (DIM).

1. Operation Searching Module.

The query mode of the operation searching module (OSM) is consistent with that of the material acquisition module (MAM). The fuzzy retrieval module (FRM) conducts a query of the database based on the input keywords and display the information corresponding to keywords in a certain order. The related information but different with the keywords can be added into this order. The language of the displayed information is same to the language consistent with an operation interface of information user.

When content displayed in a search result of the user does not include any effectively matched data or displayed data cannot meet a requirement of the user, the user submits, in the operation interface, content of unsatisfactory information to persons of the data management module by using a corresponding interaction option for applying. After the corresponding checking of the system is complemented and an association relationship is established, the user can use brand new content of the application. Similarly, the user can feedback any association abnormity found in a use process of the platform's system to background maintenance persons. The administrator can complete and maintain related information through corresponding data maintenance module (DMTM).

In addition to content that can be retrieved usually and that is not recorded in a database yet, some content has been entered by the user but does not conform to information in a currently searching region. Any searching module or maintenance will not be invoked in a next step. For example, enter "water" as a keyword in an operation searching region. The data error correction module (DECM) lists a set of search results and show an Operation Tip that the results do not match the searching. For example, Operation Tip is "This content is non-selectable, please try others".

2. Data Interoperable Module (DIM)

When the user selects any listed search result through retrieval, the system provides a corresponding unique ID in the database based on the search result. The Data interoperable module (DIM) unique ID invokes related information of a complementary dimension from the database where the operation is located and interacts with a front end for display. Specific interaction information conforms to a corresponding profession. A normative restriction on an operation for the interaction information comprise but is not limited to: time, magnitude unit, value, operation range, and other definition information of different dimensions related to the corresponding operation.

For example, "heating" in a chemical experiment needs to clarify the "heat source", "the thermal effect value", "direct heating" or "indirect heating", "heating time" or another specific information values in different dimensions, etc.

Certainly, user do not input information in any language but add a specific value and select a unit or select specific options for different condition items based on providing detailed dimension descriptions according to detailed information given by input interaction guidance. Corresponding displaying interaction content optimizes a convenient interaction mode of the user based on providing some default values.

For example, a specific interaction example is as follows: in the food processing field, the user selected "slicing" as a data of operation information, the related information of dimensions: "volume" and "time" are popped up. Options for "volume" are "thin: 5 cm*2.5 cm*0.2 cm", "thick: 5 cm*2.5 cm*0.4 cm" and "customize". When the user select "customize", values corresponding to length, width, and height and unit input boxes are displayed on the interaction interface. The system provides the default unit "cm" because of a default display requirement of interaction in a Chinese environment for the field of food processing. The user can also customize related interaction units as needed. When entering "time", it has similar interaction. Options "customize" and "fast estimate" are provided by default. After selecting "customize", the user can select different units and input duration information for a specific operation. After the user selects "fast estimate", the system invokes coefficients corresponding to different categories and total masses of an operation "slicing" from the database based on information, such as a category and a total mass of a raw material in a step, input by the user. It provides a general standard value in the form of multiplication. Specific values of the coefficients are acquired by averaging values of multiple samples under normative standards of a laboratory.

Maintenance-related to default values and automatically calculated data is supplementary maintenance performed by the persons of the data management module according to corresponding requirements provided by acquisition and user in a relevant field. Maintenance persons can maintain different default values according to the acquisition and input needs of other professions; put forward corresponding data requirements for a laboratory as required; and based on completing data information, supplement different standards for the information content of varying acquisition and input operations of other professions.

For specific interaction content displayed in the dimension in an interactive interface of operation acquisition, the input persons need to complete a specific particular implementation scheme in operation steps for recording and displaying. Through modularized completion and completion of corresponding information, specific explicit content in a display operation step is taken as a sample. Acquired professional information that needs to be clarified is recorded and input. Moreover, culture-differentiated interaction in different formats and languages is provided for the input persons in a modularized and informationized interaction mode based on a uniform professional acquisition interaction interface. The system further provides input crossing cultural fields and backgrounds, as well as input options of different cultural backgrounds that need to be used when the input persons fail to explicitly find or define relevant content in a corresponding cultural background (especially, in a cutting-edge field of scientific research, when failing to make a detailed definition for multi-languages and multi-cultures in a short time, the input persons can perform searching and selection crossing cultural backgrounds according to their knowledge in a relevant field) or when the input persons have diverse backgrounds III. Product Management Module (PMM)

In addition to the new data of material information acquired in each step, the data of product information of other steps are also an essential source of the material for a complete process. According to the above description, the data of product information is Step Information acquired in the previous step, comprise the data of material information and the data of operation information in the same period and also consists of an information set of a plurality of steps.

To better record and keep standardized input, a data of product information (DPI) is formed by splicing specific DMI and DOI of a previous step and is input into the system as a result of a new DMI to be used in a subsequent step. Because all DPI in the system are formed by contents, steps, and process that have been input, corresponding digitization information is consistent with a previous step, avoid information missing and information omission.

For example, in food processing, the DMI is an egg, and the DOI is boiling in the previous step. the output DPI of the previous step is displayed in a form of "step ID (generated by the system according to a sequence number of the step and recorded by the system)+egg+boiling". The steps to produce the product can be viewed according to the step ID.

The combined or nested DPI of a plurality of steps is generated in the same logic. Generated content is displayed in columns of DMI and DPI, and arranged in an order of selection. In addition, the previous step that has been input into the system can be quickly found according to the step ID, such that an input user selecting content can clearly learn specific details of the content. In addition, the previous step that has been input into the system can be quickly found according to the step ID, such that an input user selecting content can clearly learn specific details of the content. And, by using the ID of the data already in the database achieve the relative matching process of each data, user input information can be displayed in different languages and formats, to different viewers and users, avoiding ambiguity of recorded content due to cultural and professional differences.

In addition to the complete selection of DPI, users only select part of the DPI in many cases or different quantity of DPI in subsequent operations. Therefore, need to split or combine the DPI accordingly. After obtaining the data of product information in previous steps from the database, creation of the previous steps displayed in the interactive page. When user edits the DPI, the system will generate a new supplementary ID based on the original step ID, indicating that the newly generated DPI is a new data formed by performing related operations based on the original ID. In the editing interface, by selecting and editing the corresponding data of product information, the user can change the usage ratio and different values of the data of material information (DMI). But, the user cannot edit the data of operation information. In this way, without changing the way the history of formed existing data, choose different individual orders of magnitude for the product.

The editing of the DPI by the user is more like the selective use of the already formed product. However, some operations that have undergone chemical changes or caused denaturation of the existing raw materials cannot be input. For example, electrolysis of water produces hydrogen and oxygen, or milk and yeast are fermented to form yogurt and water. Because the properties of the raw materials of the products of these steps have changed, the input user is allowed to split and accumulate them effectively in the subsequent links directly. Just like oxygen generated by electrolysis of water, oxygen generated by water with the same mass per unit time is different through different technical means, and the specific magnitude order cannot be accurately matched simply through the prior art. Therefore, in this technical solution, if encountering a similar situation where the denatured products need to be split and accumulated for use, the input persons can contact the persons of the data management module through an assistance button of the interaction interface. After the corresponding formal materials are submitted and reviewed by the maintenance persons, the maintenance persons will replace the corresponding ID of the generated product of the original step, so that the product is the corresponding ID of the original raw material, for example, the product formed by fermenting milk and yeast is no longer "step ID+milk+yeast+fermentation", but replaced with "step ID+yogurt+water". This can solve the problem that the related products cannot be further selected and input due to special denaturation changes.

IV. Data Management Module (DMGM)

The data management module (DMGM) is a module for managing data at a database side, which comprise storage of various types of data and interacts with the above-mentioned functional modules of the client to complete corresponding functions. The data management module comprises a data maintenance module (DMM) that ensures that the primary content, maintenance content, and association relationship of various types of data are stored accurately. The data is continuously added, revised and deleted according to customers' requirements.

To ensure the professionalism, comprehensiveness, convenience, and standardization of the input information for the input persons of different cultures, different backgrounds, and different professions, a need of solid professionalism and flexible expansion is sufficient and necessary for the informationized input system. Therefore, when the system is built according to this patent, the data and the framework are completely separated, and by relying on different data requirements and association with the establishment of the corresponding framework, the interactive data input system which has a high automation degree, and can be continuously expanded and improved is realized.

The data generally comprise into two categories: the stored data in the database and the input data entered or edited by the user. The stored data is a data basis necessary for the interaction display of the system. Except for the data that the system allows for initial import, the persons in charge of the data management module input the corresponding tested data after inspection and review according to the needs of different professions. The data is mostly provided by laboratories or research institutions. After dividing the real operation process into standard steps, generating interactive interface base on the stored data according to the demand of real process of different professional fields, obtain the data or specific values created or entered by the user, form the edited input data, and then and store it in the database. The interactive method by using system data to generate interactive pages and obtain the user input data, which can standardize and process data. Make the way to obtain data in a standardized and streamlined way The existing form of the original data mainly comprise the name definition, dimension definition, and professional definition of things. The name definition consists of the primary display name, generic name, academic name, common name, colloquial name in different languages, and other definitions of different forms of language for the same thing. This portion is mainly related to the retrieval of the raw material and the operation. The content of other names for the same thing in other languages is a relatively frequent maintenance component of the data management module. By continuously maintaining and supplementing other definition names of the same thing, users can find, by searching, the things they need to use according to their known definitions.

For things, the dimension definition is the definition of their specific composition of existence and reality. Just like for objects in general, the data maintenance module can manage their corresponding groups to automatically associate their mass, volume, and state (solid, liquid, gas, Etc.), temperature and other specific physical dimensions to describe their observed specific form, and of course, specific definition services are provided for individual things. As for the operation process, the specific operation method, the corresponding operation time, and other factors constitute a specific condition of the operation process that can be recognized and executed. Compared with things, dimensions such as mass, volume, temperature, and time exist independently and are used as a frame of reference to measure things. The data management module associates a dimension of an object with a definition of that object. In this way, during input interaction of this system, the user can make a standardized and clear input option and obtain standardized input data.

For example, after an object is associated with the dimensional information such as mass, volume, and temperature in the database, when the user inputs the data information of a corresponding object, the interaction interface will prompt the unit options corresponding to the dimensions such as mass, volume, and temperature, and the value options to be input. The system can retrieve different units corresponding to mass, volume, and temperature from the database according to the user's settings and provide the default unit that conforms to the user's entering habits. The user needs to input the corresponding value of the dimension of the current step according to the real process. Standard raw material information is stored for the data input in this system.

This dimensional information defining a specific object can also be maintained by the system. The manner of maintaining content comprises but is not limited to adding, revising, choosing units, inputting value ranges, selecting items, displaying in corresponding formats and modes. Such information also has different definitions in different languages and has different names, which need to be maintained in the database. As mentioned above, the display form corresponding to the interaction interface is mainly composed of fixed value input boxes, drop-down options, multiple-answer options, and single-answer options. The corresponding display form is associated with dimensional information or professional information. The standardized and unique data guidelines can be applied for different matters. At the same time, although data is input in different formats for different meanings, the standards are consistent.

The professional definition and the dimension definition are consistent, but they pay more attention to the standardized definitions required by different professions. For example, in food processing, it is necessary to consider whether the inedible portion contained in the object needs to be automatically removed or whether the inedible part has been removed when the user inputs it. However, the dimensional option of removing inedible portions does not need to be explained in the field of chemical experiments. In the field of chemistry, there is no need to consider whether the raw materials used can be eaten. The definition of different professional fields will be selected by the user before entering the interaction interface to input specific data, thereby activating different definition dimensions and corresponding interactions of the same thing in different professional fields.

In addition to maintaining the original data, the maintenance of the input data is also an essential function of the data management module. As mentioned above, the data management module mainly implements the assistance function. The assistance function has been described in detail above, and it is mainly used to deal with the changes of products in different forms generated by the recording of some specific information. The interaction model of the data input assistance function in the interface of the data management module is basically the same as the interaction interface corresponding to ordinary users, except that specific things can be added, deleted, and modified. Because its function will cause inconsistency in data records, data fraud, and other problems for standardized input, it will not be open to ordinary users. When an ordinary user puts forward a specific operation request and submits the necessary proof materials and corresponding data results, the persons of the data management module can compile and modify the content uploaded by the user, and carry out relevant identification, to ensure the standardization and consistency of the input information of the system.

A use case on the client and performed according to the idea of the present invention comprise the following steps.
Step 1: Raw Material Acquisition.

In S1, an input box is clicked in the preparation phase.

In S2, search content is entered in a raw material input box.

After a user enters a name of food material in the input box and presses "Enter"/clicks a magnifier, a front end triggers searching for a food material list. and delivers a search name to a back end. The search name may include a common name (containing multiple fields), a display name, or a detailed name. The rear end fussily searches a data table for a food material matching the common name and feeds back a food material list and a total quantity in pagination.

In S3, a target option is selected.

In S4, an interaction page is generated, a search result is clicked, and a front end triggers a food material details searching interface, where a number of the food material is fed back in step S2; the interface delivers the number of the food material to the back end; the back end searches the food material list for details about the food material; and the details are packaged into an object DesLang (including number, language identifier, detailed name, abbreviation, detailed name+common name, display name, sequence, description, edible identifier, and the like, which are used by the front end for displaying and generating the interaction page.)

S5: Information completion is performed according to the interaction page.

For the above steps, refer to FIG. 5.

Step 2: Operation Acquisition

In S1, an input box is clicked in the preparation phase.

In S2, search content is entered in an operation input box.

An interface is triggered, by pressing "Enter"/clicking a magnifier, to deliver the search content to the background. The background performs fuzzy matching in an action table. A data object (including action number, action name—to be displayed at the front end after a selection action is performed and common name and language identifier) is fed back.

In S3, a target option is selected.

In S4, an interaction page is generated, and a search result is clicked.

Alternatively, the interactive page is generated directly, and operation information starts to be complemented.

In step 1 and step 2 above, if the input search content does not logically match a raw material or an action, the following prompt pops up: "No operation is found. Go to the customer service mailbox for consultation."

For the above steps, refer to FIG. 6.

Information acquired in step 1 may be stored separately or stored together with information acquired in step 2 to form a product. The product may also be split and be repeatedly retrieved and used.

How a display example is recorded in a normalized professional field is described in detail by using a step-input example that comprise all modules. A relatively simple and popular example, for example, "boiled egg" in the field of food processing, is used for description.

The following first describes, by using words, the type of information to be subjected to digitization. 200 g of purified water at room temperature and two large shelled eggs, each of which is about 57 g and stored in a refrigerator at 4° C. are taken and put in a pot, and the eggs are boiled at 100° C. for 5 minutes under standard atmospheric pressure.

Before the information is input, an initial data environment of the system has maintained, in data in the field of video processing, information about using eggs and water as raw materials and basic information of using water for an operation. Initial information comprise different names that are of egg (fresh whole egg) and that correspond to a unique ID: "Chinese characters: 新鲜鸡蛋 (Xinxianjidan in Chinese pinyin; fresh egg), 新鲜的完整鸡蛋 (Xinxiandewanzhengjidan in Chinese pinyin; fresh whole egg), 鸡蛋 (Jidan in Chinese pinyin; egg), 鸡卵 (Jiluan in Chinese pinyin; another name for egg), . . . ; English: "egg (chicken); egg, whole, fresh, . . . "; Japanese: characters "keiran", characters "tamago (keiran)", kanas "tamago", . . . ; and content of different text information corresponding to other different languages." Information maintained simultaneously comprise the following common dimensions corresponding to the ID of egg (corresponding text information is also recorded in initial data of multilingual display content of dimension information interaction).

"Quality information, including a value input option of a convertible unit (Specific information of a corresponding raw material is maintained separately for each raw material. For example, unit maintenance corresponding to the ID of egg comprise: "gram, g, kg, mg, bl, cup, ml, L, gal, fl. oz, oz, fl, large egg (about 57 g), medium egg (about 47 g), extra-large egg (about 66 g), and the like)".

Storage temperature: including a default option but allowing a user to input a value after selecting a unit (Initial dimension data of storage temperature comprise: a default option of room temperature (24° C.), specific temperatures allowed to be input by a user, and temperature units: "Celsius", "Fahrenheit", and "Kelvin").

Atmospheric pressure: including a default option but allowing a user to customize a specific value (including a default option of 1 atm, allowing a user to input a specific value, and providing corresponding units: "bar, Pascal (Pa), standard atmospheric pressure (atm), millimeter of mercury (Torr) (mm Hg, Torr), kilogram-force per square centimeter ($kgf/cm^2$)).

Use professional dimension data (allowing a user to select one of the following options: "edible" (default) and "inedible" (optional)).

Remove the inedible portion (allowing a user to select one of the following options: "Auto" (default) (automatically judging whether to remove inedible portions) and "Reserve" (optional)).

The same is true for information corresponding to pure water, which will be explained in part when selecting the specific interaction interface.

The operation information, "boil" also has similar initial maintenance information. First of all, it also corresponds to the unique ID of boil in the database. The language text information corresponding to different forms of boils in different languages are maintained, such as Chinese characters "Zhu, Dun, Bao . . . ", such as English "cook (boil), boil, boiled . . . ", or such as "Japanese kanas "yude", Japanese kanas "yuderu", Japanese character+kana "niru", Japanese character+kana "nie" . . . ", and in addition, dimension information items corresponding to the professional needs in the field of food processing are maintained (including relevant interaction text information in different languages, such as common prompts language, description options that need to be input)".

"Operation duration: allowing the user to input specific values under selecting units including month, day, year, week, hour, minute, second . . . .

Operation temperature (corresponding to the associated dimension of boil): allowing the user to input specific values when selecting units: temperature units (including "Celsius", "Fahrenheit", and "Kelvin"), and heat power temperature (including the default value that is a specific unit option in the field of food processing, performing mutually exclusive selection with the temperature units at the operation temperature, specifically including: "big fire lv8", "medium fire lv5", and "small fire lv3" that can be quickly selected, or allowing the user to input values from 1 to 13 to distinguish the units of different lv)".

With the specific information set in advance, the input user can quickly and accurately input the effective corresponding field information under general rules. Herein, the display of the interaction interface and the complementary association relationship are described in detail.

First of all, the user currently performing inputting is defined as a user who operates in Beijing in Chinese (Simplified).

After the user enters egg, the content in the special database containing egg in the Chinese environment is preferentially selected for display, such as "Run! Egg!", "egg cake crisp", etc., but words that conform to the input rules, such as egg (chicken); egg, whole, and fresh; and duck egg, will be displayed according to a certain priority order. When the user selects egg (chicken), because the user's operation environment is a Chinese environment and is used as the input environment in Beijing, it will be displayed first here.

Quantity: requires a user to enter a value. The default unit is g. (Another unit can be selected in a drop-down box.)

Temperature: Room temperature 24° C. (An interaction display interface including an input box and a default unit such as quantity is displayed after a user selects "customize" from a drop-down box. For example, the value can be customized to Freeze –18° C.)

Air pressure: Standard atmospheric pressure 1 atm (An interaction display interface including an input box and a default unit such as quantity is displayed after a user selects "customize" from a drop-down box.)

Edible or inedible: "Edible" is selected by default. Another option is "Inedible".

Remove inedible portion: "Auto" is selected by default. Another option is "Reserve".

An input user can input information autonomously.

"Quantity: 2 large eggs (about 57 g)

Temperature: 4° C.

Air pressure: Standard atmospheric pressure 1 atm (Recommended default value)

Edible or inedible: "Edible" is selected by default. (The default value is recommended.)

Remove inedible portion: "Auto" is selected by default. (The default value is recommended.)
"

Then, water is selected. Similar input interaction is displayed.

"Quantity: 200 g

Temperature: Room temperature 24° C. (The default value is recommended.)

Air pressure: Standard atmospheric pressure 1 atm (The default value is recommended.)

Edible or inedible: "Inedible" is selected.

Remove inedible portion: "Auto" is selected by default. (The default value is recommended.)
"

Then, "boil" is selected to open the corresponding interaction.

"Operation duration: enter a specific value. The default unit is minute.

Operation temperature: select "customize temperature", "big fire lv8", "medium fire lv5", "small fire lv3", or "customize heat power" from a drop-down box. (When "customize temperature" is selected, an input box is displayed for a user to enter a value, and a default temperature option is displayed.)
"

The user performs supplementary input.

"Operation duration: 5 (Default unit: minute).

Operation temperature: 100° C. ("Chinese-Beijing" is selected for the default unit. No additional operation or selection is required.)
"

In this way, the user completes the input of a step; a product (containing a unique ID) of this step is formed: egg (chicken), water|boil.

The following related information is included:

"Quantity: 2 large eggs (about 57 g)

Temperature: 4° C.

Air pressure: Standard atmospheric pressure 1 atm (The default value is recommended.)

Edible or inedible: "Edible" is selected by default. (The default value is recommended.)

Remove inedible portion: "Auto" is selected by default. (The default value is recommended.)

"Quantity: 200 g

Temperature: Room temperature 24° C. (The default value is recommended.)

Air pressure: Standard atmospheric pressure 1 atm (The default value is recommended.)

Edible or inedible: "Inedible" is selected.

Remove inedible portion: "Auto" is selected by default. (The default value is recommended.)

"Time: 5 (Default unit: minute).

Operation temperature: 100° C. ("Chinese-Beijing" is selected for the default unit. No additional operation or selection is required.)
"

When an English (United States)-speaking user needs to use information about the product, the following (a display name applicable to the corresponding language and the region) is displayed: "egg (chicken); water|boil". The following information is included:

"Quantity: 2 large (about 2 oz)

Temperature: 39.2° F.

Air pressure: Standard atmospheric 1 atm (The default value is recommended.)

Edible or inedible: Edible (The default value is recommended.)

Remove inedible portion: Auto (The default value is recommended.)

"Quantity: 1 Cup

Temperature: Home temperature 75.2° F. (The default value is recommended.)

Air pressure: Standard atmospheric 1 atm (The default value is recommended.)

Edible or inedible: Inedible

Remove inedible portion: Auto (The default value is recommended.)

"Time: 5 (Default unit: min)

Temperature: 212° F. ("English-United States" is selected for the default unit. No additional operation or selection is required.)

The above specific maintenance information is used as startup data input in the interaction interface by the user. When needing to complete content in the information during operation, the user can contact maintenance service persons by clicking a maintenance link in the interaction interface. The user needs to provide specific information and a specific requirement for addition or modification and can change the above specific maintenance information after system maintenance persons review the specific information and the specific requirement and perform maintenance. For example, a Japanese-speaking user may enter the Japanese character "tamako" in a raw material searching interface. When a search result contains specific information that the user wants to select, the user can contact the service person and provide a requirement of adding the Japanese character "tamako" as a common name of Japanese characters "tamago (keiran)". Data maintenance persons sends a requirement proposed by the input persons to corresponding professional persons for judgment and classification and conduct corresponding maintenance and management (to ensure that the database has no ambiguous or duplicate data) after the requirement passes multiple-people review. Herein, the requirement is sent to Japanese-speaking input maintenance persons for review. When finding that Japanese characters "tamako" refer to a cooked egg, rather than a fresh egg, the maintenance persons deny the input requirement, feed back a result to the input user, and add Japanese characters "tamako" to a non-selectable region. When the input user clicks Japanese characters "tamako" after searching at an interactive side, the following prompt is popped up: Non-selectable option. Do you want to select the Japanese characters "keiran", "tamago (keiran)", or Japanese kanas "tamago"?

What is claimed is:

1. A programmatic data processing system, comprising a client device and a data management module;

the client device includes an operation interface, and the operation interface contains an input interface and an interaction display interface;

the data management module includes a database for storing and managing a plurality of information, wherein the information includes: a data of material information (DMI), a data of operation information (DOI) and a data of product information (DPI), wherein the data of product information is data set comprising the data of material information and data of the operation information acquired during a processing period, each data of material information, data of operation information and data of product information has a unique ID; wherein the data of material information comprises physical attribute data of the materials and/or data of environmental information to which the materials belong; the data of operation information comprises operation actions and/or navigation behaviors and/or judgment choice;

wherein the data management module comprises a data maintenance module, the data maintenance module is configured to input the data of material information, the data of operation information, and the data of product information in the initial stage, or to renew DMI, DOI, DPI and related information according to the needs of a user, the data maintenance module is further configured to display comprehensive data content in the interaction display interface; and an acquisition module having at least one processor, one end is connected to the operation interface, and the other end is connected to the data management module, configured to sequentially collect and process data, the acquisition module is configured to stepwise sequentially acquire data of material information and data of operation information for processing the materials during the processing period, wherein:

the acquisition module comprises a material acquisition module, the material acquisition module further comprises a material searching module and a first data interoperable module wherein the material searching module receive from the input interface of the client device an user input of raw materials in an "input box", obtain corresponding search results in the database through precise or fuzzy search methods, display the search results on an "interactive display page" for user to select, the system generates the unique ID in the database based on a search result item of the search results;

the first data interoperable module (DIM) comprises interactive page generation module (IPGM) and a data entry module (DEM), the interactive page generation module transmits the unique ID of the selected raw material information to the user's interaction display interface, which corresponds to the physical attribute data and/or environment attribute data of the raw material, display the corresponding items and numerical input boxes or selection boxes for the user to enter or related numerical values, the data entry module (DEM) receives input values or selection items from the user, complete and renew the raw material information and store the raw material information separately in the data management module;

the acquisition module comprises an operation acquisition module, the operation acquisition module further comprises an operation searching module (OSM) and a second data interoperable module (DIM); wherein the operation searching module receive from the input interface of the client device the user input of operation information in the "input box", obtain corresponding search results in the database through precise or fuzzy search methods, display the search results on the "interactive display page" for user selecting, the system will generate a unique ID in the database based on the search result item;

the second data interoperable module (DIM), comprises interactive page generation module (IPGM) and a data entry module (DEM), the interactive page generation module transmits the unique ID of the selected operation information to the user's interaction display interface, which corresponds to operation actions and/or navigation behaviors and/or judgment choice of the operation information, display the corresponding items and numerical input boxes or selection boxes for the user to enter or related numerical values, the data entry module (DEM) receives input values or selection items from the user, complete and renew the operation information and store the operation information separately in the data management module;

a data of product information (DPI) is formed by splicing specific data of material information (DMI) and the data of operation information (DOI) of a previous step and is input into the system as a result of a new DMI to be used in a subsequent step;

the data management module comprises a product management module (PMM), provide a complete display of the historical step products in the interaction display interface, list generated content separately in the form of raw materials and products, and arrange the generated content in the order of selection, when using the data of product information (DPI), the user is provided with options to select a complete DPI, only part of DPI, or different quantity of DPI in subsequent operations;

when user edits the DPI, the system is configured to generate a new supplementary ID based on the original step ID, indicating that the newly generated DPI is a new data formed by performing related operations based on the original ID.

2. The programmatic data processing system according to claim 1, wherein the data maintenance module further comprises a product forming module and/or a product combining module and/or a product dividing module and/or a product adjusting module;

wherein each of the product combining module and/or the product dividing module and/or the product adjusting module is associated with original product information.

3. The programmatic data processing system according to claim 2, wherein the data maintenance module maintains the material information and the operation information by group.

4. The programmatic data processing system according to claim 3, wherein the operation information completing module generates, based on basic description and/or dimensional information selected on the client from the material information and/or the operation information, an interaction interface comprising the dimensional information; and the client records specific data based on the corresponding dimensional information, and thus acquisition is completed.

5. The programmatic data processing system according to claim 4, wherein the operation information completing module further comprises a professional matching option as an optional item interacting with the client; the professional matching option is generated and maintained by the data maintenance module.

6. The programmatic data processing system according to claim 5, wherein the material searching module is configured to perform precise retrieval and/or fuzzy retrieval.

7. The programmatic data processing system according to claim 6, wherein an additional interoperable module is triggered, after conducting a query of the database based on the input keywords and displaying the information that does not correspond to the keywords through the precise retrieval and/or the fuzzy retrieval; the additional interoperable module sends a user requirement to the data maintenance module; and the data maintenance module adds an added requirement to the material information and/or the operation information.

8. The programmatic data processing system according to claim 6, wherein the material searching module further comprises an unmatched information processing module which is configured to: list a set of search results, and after the corresponding results are shown, provide an indication that a record does not correspond to the keywords after conducting a query of the database based on the input keywords.

9. The programmatic data processing system according to claim 1, wherein the material searching module (MSM) is configured to simultaneously perform both precise retrieval and fuzzy retrieval, and upon completion of the retrieval, automatically trigger generation of an interactive page displaying search results and associated data entry fields for user interaction.

10. The programmatic data processing system according to claim 1, wherein the data of product information (DPI) is selectable by the user in a three-level manner, including a complete selection, a partial selection, or a quantity-based selection of the DPI for subsequent processing.

11. The programmatic data processing system according to claim 1, wherein, when the user edits the data of product information (DPI), the system automatically generates a supplementary identification (ID) indicating derivation from the original DPI, and wherein the data of operation information (DOI) and related data cannot be directly edited by the user.

* * * * *